Figure 1:
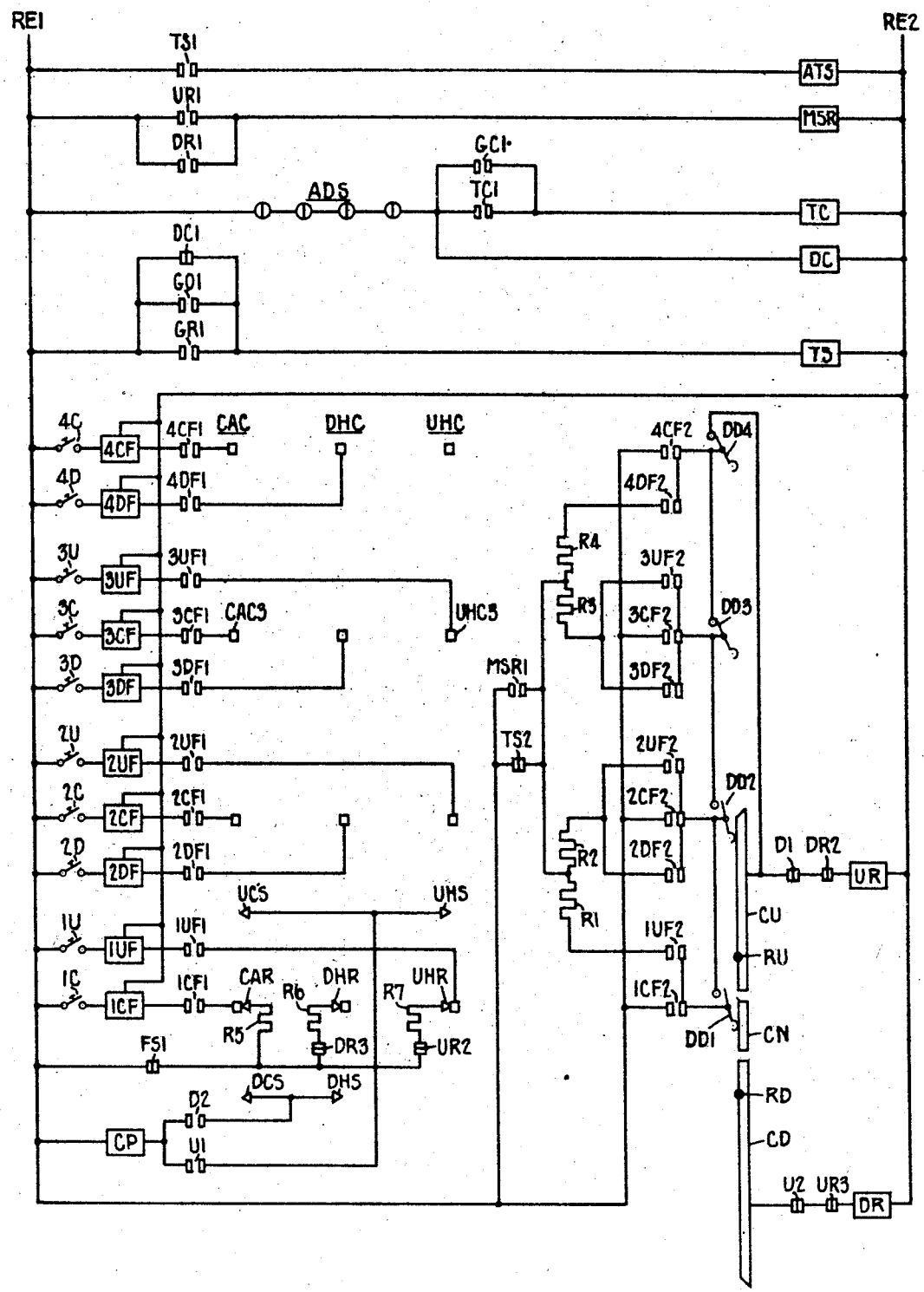

Sept. 28, 1943. H. L. HEART ET AL 2,330,489
ELECTRICAL CONTROL SYSTEM
Filed June 26, 1942 4 Sheets-Sheet 1

Herbert Loeb Heart
Lee Irwin Davis } INVENTORS

BY Matthew E. Bradley ATTORNEY

Patented Sept. 28, 1943

2,330,489

UNITED STATES PATENT OFFICE 2,330,489

ELECTRICAL CONTROL SYSTEM

Herbert Loeb Heart, Yonkers, and Lee Irwin Davis, New York, N. Y., assignors to Otis Elevator Company, New York, N. Y., a corporation of New Jersey Application June 26, 1942, Serial No. 448,666

43 Claims. (Cl. 172—152)

The invention relates to electrical control systems.

The invention involves controlling electrical circuits in accordance with certain functions of electrical apparatus and controlling the apparatus in turn by these circuits. More specifically, the control of electrical apparatus is exercised in accordance with a direct function of operation of the apparatus or one or more derivatives of that function or a combination thereof.

The invention is especially suitable for the control of the operation of electric work motors, such as elevator hoisting motors. It is desirable in elevator installations that acceleration and retardation of the car be effected smoothly and in a minimum of time consistent with comfort and safety of the passengers. To effect such control, in accordance with the invention, the operation of the hoisting motor is controlled in accordance with its speed, acceleration and rate of change of acceleration to cause uniform acceleration and retardation and constant running speed, regardless of load, with the transitions effected smoothly.

The invention will be described as applied to an elevator installation in which a direct current hoisting motor is supplied with current by a variable voltage direct current generator, such arrangement being especially suitable for application of the invention. In carrying out the invention as applied to such an arrangement, a direct current tachometer generator, driven by the elevator hoisting motor, is utilized to provide a voltage the amount and change in value of which is directly proportional to the speed and change in speed of the hoisting motor. This voltage is utilized to control the operation of a relay which controls the running speed of the motor. This voltage is also utilized to excite a transformer, the voltage of the secondary of which is utilized to control the operation of a second relay which controls the acceleration and retardation of the motor. This secondary voltage is also utilized to excite a second transformer, the voltage of the secondary of which is utilized to control the operation of a third relay which also controls the acceleration and retardation of the motor. The first relay acts to maintain the running speed of the motor constant within certain limits. When the motor tries to exceed normal running speed, this relay acts to cause decrease in the voltage of the generator and thus to prevent any substantial increase in the speed of the motor. The second and third relays act to cause uniform acceleration and retardation of the motor. When the acceleration exceeds a certain rate, the second relay acts to cause decrease in the rate of increase of the voltage of the generator and thus in the rate of increase in the speed of the motor, and when the acceleration falls below a certain rate, the second relay acts to cause increase in the rate of increase of the voltage of the generator and thus in the rate of increase in the speed of the motor. Similarly, when the retardation exceeds a certain rate, this relay operates to cause decrease in the rate of decrease of generator voltage and thus in the rate of decrease in the speed of the motor, and when the retardation falls below a certain rate, this relay acts to cause increase in the rate of decrease of the generator voltage and thus in the rate of decrease in the speed of the motor. The third relay acts to anticipate the second relay in that it acts, as soon as a change in the rate of change of acceleration or retardation starts to take place, to cause change in the rate of change of the voltage of the generator to oppose the change in acceleration or retardation.

The mode of carrying out the invention which is at present preferred and the various features and advantages thereof will be gained from the above statements and from the following description and appended claims.

Figure 1S:
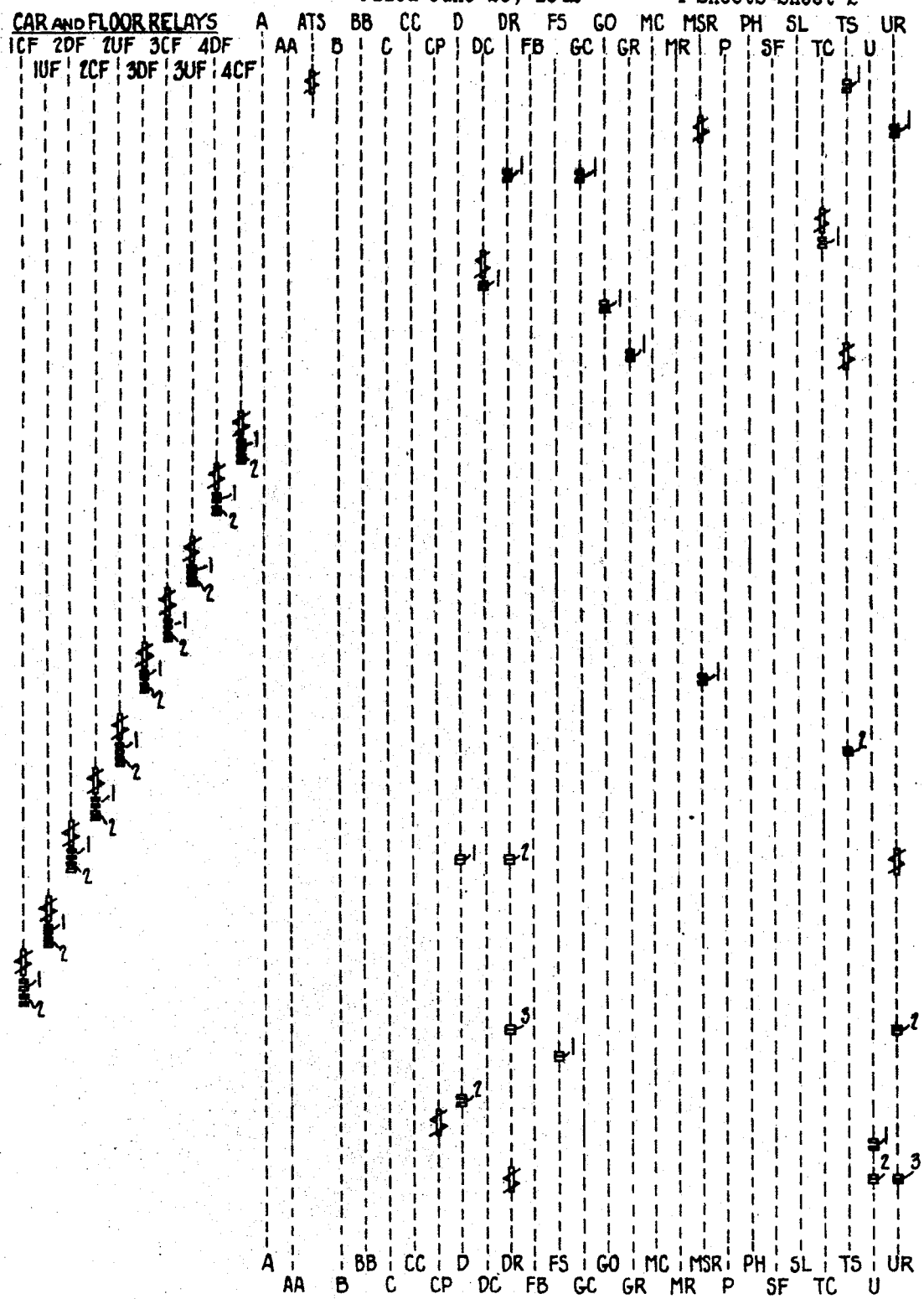
Figure 2:
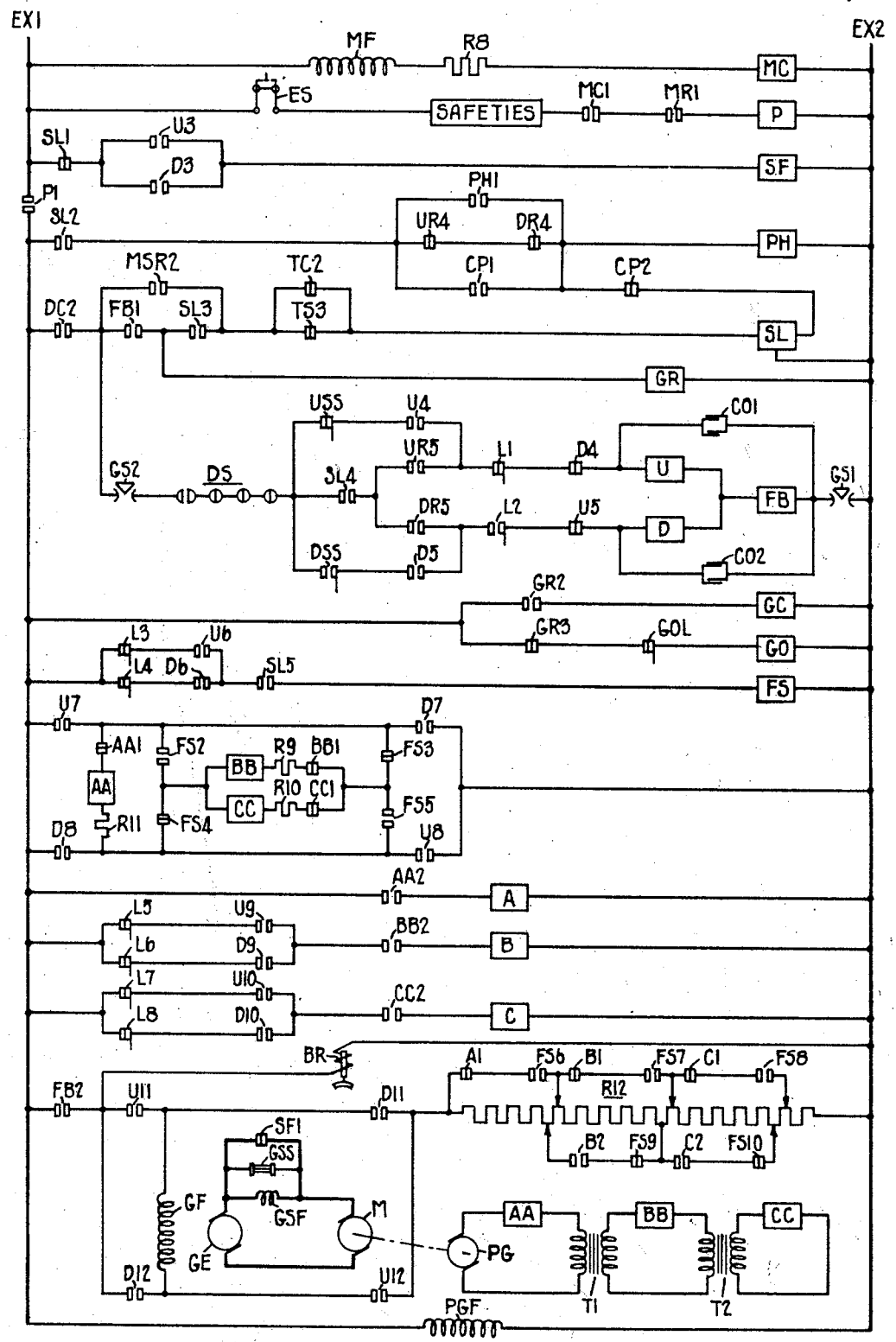
Figure 2S:
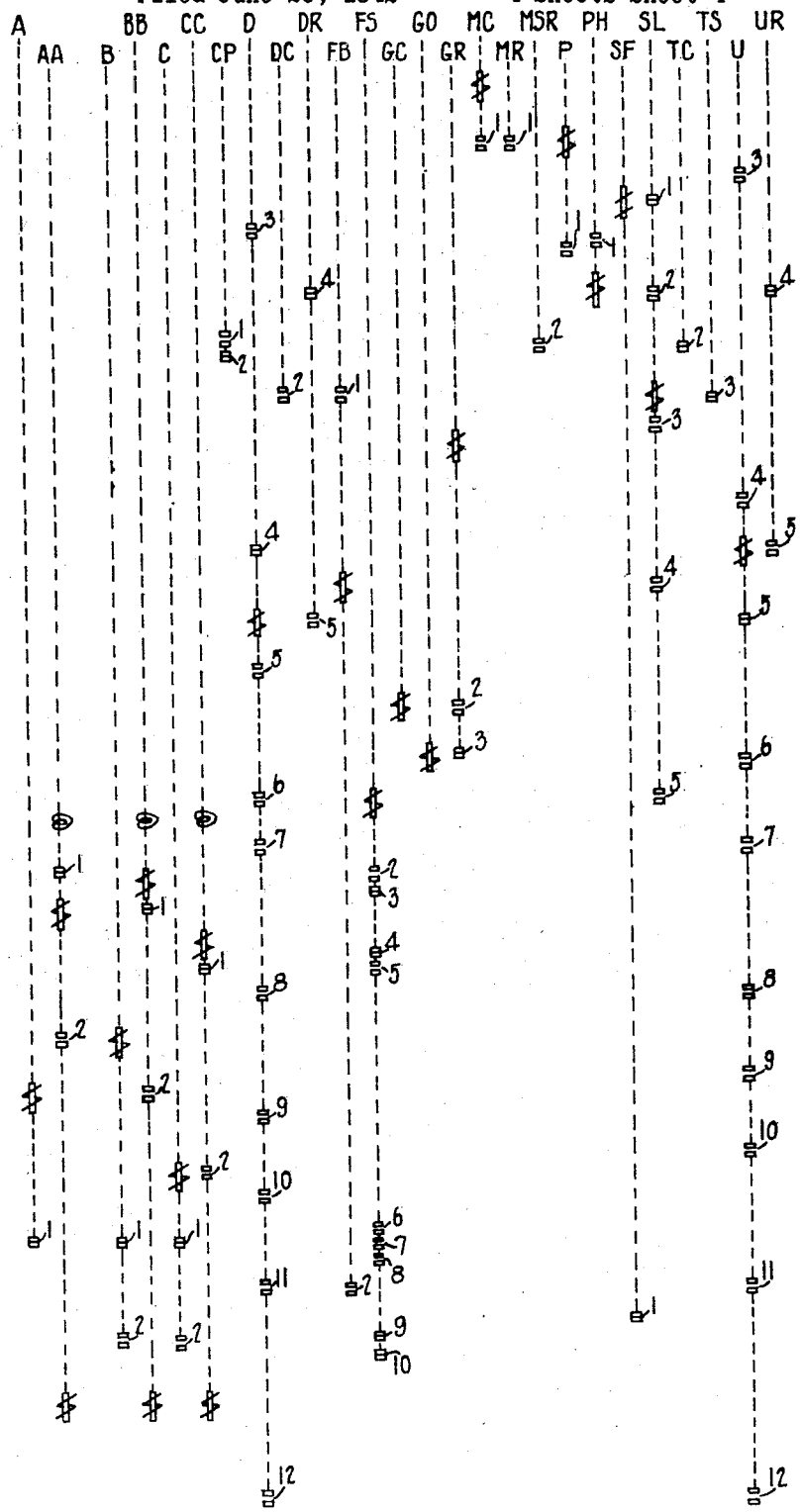

In the drawings:

Figures 1 and 2 constitute a simplified wiring diagram in "across the line" form of an elevator control system chosen to illustrate the principles of the invention; and Figures 1s and 2s are key sheets for Figures 1 and 2 respectively showing the electromagnetic switches in spindle form with the contacts and coils arranged on the spindles in horizontal alignment with the corresponding contacts and coils in the wiring diagrams.

For illustrating the principles of the invention a system of elevator control has been illustrated in which the slow down and stopping of the car at the various floors is automatic. There are various types of elevator control of this character, the type illustrated being known as collective push button control. A collective push button control system such as shown in the patent to Lewis et al., Number 2,101,146, granted December 7, 1937, has been illustrated. In the system of the Lewis et al. patent, the pressing of a push button either in the car or at a landing starts the car in a direction toward the floor for which the push button is provided. The car is slowed down and stopped at landings for which push buttons have been pressed, the car being automatically restarted after each stop so long as push buttons remain to be responded to.

Push button control circuits for only four floors are illustrated. A push button is provided in the car for each of the floors. Also, a push button is provided at the first and fourth floors and an up push button and a down push button are provided both at the second and at the third floors. The push buttons in the car are designated in accordance with their location and the floors for which they are provided. For example, 3C designates the third floor car button. Push buttons at the landings are designated in accordance with the floor and their direction. For example, 2U designates the up second floor hall button.

The push buttons act through floor relays to control the operation of the car. The floor relays are designated similarly to their controlling push buttons, the car button floor relays being designated CF and the hall button floor relays being designated UF or DF depending upon whether they are provided for up push buttons or down push buttons. The floor relays, when operated, remain in operated condition, thereby permitting the bush buttons to be released. When the call is answered, the floor relay is reset. Various forms of floor relays may be utilized. A floor relay has been illustrated in which the relay, when operated, is held in operated condition by residual magnetism. Such a relay is described in the Lewis et al. patent.

The floor relays are arranged to act through direction mechanism on a floor controller to control the direction of travel of the elevator car. This floor controller is also utilized in the form of control illustrated to control the slowing down of the car. A floor controller, of the form disclosed in the patent to Waters et al., Number 2,100,176, granted November 23, 1937, may be utilized, the particular parts of such floor controller employed in the system illustrated having been diagrammatically indicated in the wiring diagram. The direction mechanism comprises a plurality of stationary direction switches, one for each floor, designated DD1, DD2, DD3 and DD4 for the first, second, third and fourth floors respectively, and a direction cam of three sections designated CU, CN and CD carried by the crosshead. Insulating rollers for lifting the direction switches off the cams are designated RU and RD. The stationary contacts of the floor controller controlled by the car buttons, up hall buttons and down hall buttons are designated CAC, UHC and DHC respectively. The brushes for engaging these contacts to pick up calls are designated UCS and DCS for contacts CAC, UHS for contacts UHC, and DHS for contacts DHC. The reset brushes are designated CAR, UHR and DHR for contacts CAC, UHC and DHC respectively. These brushes are carried by the crosshead. An up stop switch USS and a down stop switch DSS are carried by the crosshead and are operated by stationary cams as the car arrives at the respective floors in the directions for which the stop switches are provided as explained in the Waters et al. patent.

The electromagnetic switches employed in the control system have been designated as follows:

A  Speed control switch
  AA  Speed control relay
  ATS  Auxiliary time switch
  B  Acceleration control switch
  BB  Acceleration control relay
  C  Rate of acceleration control switch
  CC  Rate of acceleration control relay
  CP  Call pick-up relay
  D  Down direction switch
  DC  Door contact switch
  DR  Down direction switch relay
  FB  Field and brake switch
  FS  Fast and slow speed switch
  GC  Gate close switch
  GO  Gate open switch
  GR  Gate control relay
  MC  Minimum current shunt field switch
  MR  Motor generator running switch
  MSR  Motor generator starting switch relay
  P  Potential switch
  PH  Pick-up holding relay
  SF  Series field switch
  SL  Slow down switch
  TC  Time cancelling rela
  TS  Time switch
  U  Up direction switch
  UR  Up direction switch relay Throughout the description which follows, these letters will be applied to the coils of the above designated switches. Also, with reference numerals appended thereto they will be applied to the contacts of these switches as for example U1.

For convenience the control system has been considerably simplified. Various parts of the system which are not shown may be arranged as disclosed in the aforesaid Lewis et al. patent to which reference may be had for a discussion of the matter omitted. The electromagnetic switches of the control system which are also utilized in the Lewis et al. patent and the floor relays are designated by the same reference letters as in the Lewis et al. patent to facilitate reference to this patent. The appended reference numerals, however, are not the same.

The armature of the elevator hoisting motor is designated M and its separately excited field winding is designated MF. The armature of the variable voltage supply generator for this motor is designated GE, its separately excited field winding being designated GF and its series field winding being designated GSF. A shunt for the series field winding is designated GSS. The driving motor for the generator is not shown. BR is the release coil of the electromechanical brake. PG is the armature of the tachometer or pilot generator driven by the elevator hoisting motor, the separately excited field winding of this generator being designated PGF. T1 is a transformer connected to the armature of the pilot generator while T2 is a transformer connected to the secondary of transformer T1. Resistances are designated generally by the letter R, condensers by the letters CO and limit switches by the letter L.

In the aforesaid Lewis et al. patent the field windings of the motor and generator, the release coil of the electromechanical brake and certain of the electromagnetic control switches are supplied with current from an exciter. An exciter has not been shown but it may be assumed that the supply lines EX1 and EX2 are connected to an exciter as disclosed in the Lewis et al. patent. Current for the coils of certain other electromagnetic switches and of the floor relays is derived from alternating current supply mains in the Lewis et al. patent, a rectifier being interposed between the supply mains and the switches to permit direct current switches to be employed. Such apparatus is not shown but it may be assumed that the supply lines RE1 and RE2 are connected to rectifier terminals as disclosed in the Lewis et al. patent.

The control system is illustrated for power operation of the car gate. The gate operating mechanism is not shown but may be arranged as disclosed in the Lewis et al. patent. With such arrangement the gate remains open while the car is idle at a floor and is closed when a call is registered. When the car comes to a stop at a floor the gate automatically opens. The hatchway doors are manually opened but automatically returned to closed position. A cam operated by the gate operating mechanism unlocks the door at the floor at which a stop is being made as the car comes to a stop at that floor. As the door is unlocked door lock contacts DS for that door are separated. Upon the opening of the door its door sequence contacts ADS separate as the door leaves closed position. Upon reclosing of the door, the door sequence contacts reengage but the door lock contacts remain separated. When the gate operating mechanism returns the gate to within a short distance of closed position the door is locked and the door lock contacts are engaged. Also when the gate reaches closed position it closes gate contacts GS1 and GS2.

An emergency stop switch ES is provided in the car and the contacts of the various safety devices are indicated by the legend "Safeties." The electromagnetic switches are illustrated in deenergized position. Also, all latching switches are illustrated in reset condition.

Before describing the control of the acceleration, retardation and running speed of the elevator hoisting motor, operation of the car in response to the push buttons will be described. Assume that the car is idle at the first floor, the floor controller circuits being illustrated in accordance with this assumption. As the car is idle, the first floor hatchway door is closed but not locked and the car gate is open. Door lock contacts DS for that door and the gate contacts GS1 and GS2 are therefore separated. Door sequence contacts ADS for that door, however, are in engagement. Thus a circuit is completed for the coil of door contact switch DC so that contacts DC1 are separated and the coil of time switch TS is deenergized. It will be further assumed that the time interval of time switch TS has expired. Also contacts DC2 are in engagement, preparing the circuits for the coil of up direction switch U and for the coils of other electromagnetic switches.

Assume now that an intending passenger at the third floor presses the up third floor hall button 3U. This completes the circuit of the operating coil of up third floor relay 3UF. The third floor relay operates to engage contacts 3UF1 and 3UF2. The floor relay is magnetically latched in operated condition so that these contacts remain engaged after the push button is released. Contacts TS2 of the time switch being in engagement, contacts 3UF2 complete a circuit for the coil of up direction switch relay UR, this circuit being from line RE1 through contacts TS2, resistance R3, contacts 3UF2, floor controller direction switches DD3 and DD4, interlock contacts D1 and DR2, and coil UR to line RE2.

Up direction switch relay UR, upon operation, engages contacts UR1 and UR5 and separates contacts UR2, UR3 and UR4. Contacts UR3 are interlock contacts for the coil of down direction switch relay DR. Contacts UR5 further prepare a circuit for the coil of up direction switch U. Contacts UR1 complete the circuit for the coil of motor-generator starting switch relay MSR. Relay MSR, upon operation, engages contacts MSR2 to prepare the circuit for the operating coil of slow down switch SL.

Other contacts (not shown) on relay MSR cause the starting of the motor generator set and exciter set, as set forth in the aforementioned Lewis et al. patent. As the exciter voltage rises, the elevator motor field builds up and upon its reaching a certain value, relay MC operates engaging contacts MC1 to prepare the circuit for the coil of potential switch P. It also engages contacts (not shown) to cause operation of motor generator running switch MR which changes over the generator driving motor to running connections. Switch MR also engages contacts MR1 to complete the circuit for the coil of the potential switch. The potential switch operates to engage contacts P1 in feed line EX1. This completes the circuit for the operating coil of slow down switch SL through contacts DC2, MSR2, and TS3 and TC2 in parallel.

The slow down switch SL, upon operation, engages contacts SL2, SL3, SL4 and SL5 and separates contacts SL1. Contacts SL4 further prepare the circuit for the coil of up direction switch U. Contacts SL5 prepare the circuit for the coil of fast and slow speed switch FS. Contacts SL3 complete a circuit through contacts DC2 and MSR2 for the coil of gate control relay GR. This relay, upon operation, engages contacts GR1 and GR2 and separates contacts GR3. Contacts GR1 complete a circuit for the coil of time switch TS. The time switch operates immediately to engage contacts TS1 and separate contacts TS2 and TS3. Contacts TS1 complete a circuit for the coil of auxiliary time switch ATS. Contacts TS2 are now by-passed by contacts MSR1.

Contacts GR3 of the gate control relay are in the circuit for the coil of gate open switch GO. Contacts GR2 complete the circuit for the coil of gate close switch GC. The gate close switch, upon operation, engages contacts GC1 to complete a circuit for the coil of time cancelling relay TC. This relay, upon operation, engages contacts TC1 to establish a self-holding circuit. It also separates contacts TC2 which together with the separation of contacts TS3 breaks the circuit for the operating coil of slow down switch SL. The slow down switch is of the same type as the floor relays, being magnetically retained in operated condition when the circuit for its operating coil is broken.

The gate close switch GC engages other contacts (not shown) to cause operation of the gate operating mechanism to effect the closing of the gate. When the gate nears closed position, the door lock retiring cam lifts, locking the hatchway door and closing door lock contacts DS. When the gate is fully closed, gate contacts GS1 and GS2 close. This completes a circuit for the coils of field and brake switch FB and up direction switch U. This circuit is through contacts DC2, gate contacts GS2, door lock contacts DS, contacts SL4 and UR5, terminal limit switch L1, contacts D4, coil U and coil FB, and gate contacts GS1. Switch FB upon operation engages contacts FB1 and FB2. Switch U upon operation engages contacts U1, U3, U4, U6, U7, U8, U9, U10, U11 and U12 and separates contacts U2 and U5.

Contacts U5 are in the circuit for the coil of down direction switch D while contacts U2 are in the circuit for the coil of down direction switch relay DR, these contacts and contacts D4 and D1 serving as electrical interlocks. The engagement of contacts U3 is without effect at this time as contacts SL1 are separated. Contacts U1 render floor controller up brushes UCS and UHS "alive." The engagement of contacts U6 completes a circuit for the coil of fast and slow speed switch FS. This switch separates contacts FS1 to render reset brushes CAR, DHR and UHR ineffective. It also engages contacts FS2, FS5, FS6, FS7 and FS8 and separates contacts FS3, FS4, FS9 and FS10 for the starting operation.

Contacts U11 and U12 together with contacts FB2 complete a circuit for generator field winding GF through contacts B1, FS6, A1, FS7, C1 and FS8 and a portion of generator field control resistance R12. Contacts FB2 also complete the circuit for brake release coil BR. This causes the brake to be released and with the energization of field winding GF voltage is generated by the generator armature GE which is applied to motor armature M to effect the starting of the car. The direction of current flow in field winding GF causes the polarity of the voltage generated to be such as to cause the car to start in the up direction. With substantially the whole of generator field control resistance R12 short circuited, the rate of acceleration of the hoisting motor is dependent upon the time constant of the generator field and is controlled by the operation of relays BB and CC as will be explained later.

When the car was positioned at the first floor, center direction cam section CN was in engagement with the arm of first floor direction switch DD1, and the up direction cam section CU was in engagement with the arm of second floor direction switch DD2. As the car moves in the up direction, the up cam section moves into engagement with the arm of the third floor direction switch DD3, opening this switch to transfer the circuit for coil UR to cam section CU and the arm of switch DD3. Also, the center direction cam section CN successively disengages the first floor and second floor direction switches DD1 and DD2 as the car moves in the up direction and these switches are transferred to down circuits.

As the car nears the third floor, up brushes UCS and UHS engage stationary contacts CAC3 and UHC3 respectively. As the up third floor relay is operated, the engagement of brush UHS with contact UHC3 completes a circuit through the coil of call pick-up relay CP, contacts U1, brush UHS, contact UHC3, contacts 3UF1 and the reset coil of relay 3UF. The voltage thus applied to this reset coil is not sufficient to reset the relay. The call pick-up relay CP, however, operates to engage contacts CP1 and separate contacts CP2. The separation of contacts CP2 prevents the energization of the restoring coil of slow down switch SL upon engagement of contacts CP1. The engagement of contacts CP1, however, completes a circuit for the coil of pick-up holding relay PH through contacts SL2. The pick-up holding relay engages contacts PH1 to by-pass contacts CP1, thus establishing a self-holding circuit.

As brushes UCS and UHS disengage their respective stationary contacts CAC3 and UHC3, up insulating roller RU engages and lifts the arm of direction switch DD3 off cam section CU. This breaks the circuit for the coil of up direction relay UR. This relay drops out, separating contacts UR1 and UR5 and reengaging contacts UR2, UR3 and UR4. Coils U and FB are maintained energized after the separation of contacts UR5 through contacts U4 of the up direction switch and up stop switch USS.

The call pick-up relay CP is maintained operated until brush UHS leaves contact UHC3. When this disengagement occurs, the circuit for the coil of relay CP is broken and the call pick-up relay drops out to separate contacts CP1 and to reengage contacts CP2. The reengagement of contacts CP2 completes the circuit through contacts SL2 and contacts PH1 for the restoring coil of slow down switch SL. This coil acts to "kill" the residual magnetism of the slow down switch, causing the switch to drop out. Upon dropping out, the slow down switch separates contacts SL2, SL3, SL4 and SL5 and reengages contacts SL1. The reengagement of contacts SL1 completes the circuit for the coil of series field switch SF. The series field switch operates to separate contacts SF1 in shunt with the generator series field winding GSF. This strengthens the series field for the slow down operation. The separation of contacts SL5 breaks the circuit for the coil of fast and slow speed switch FS. This switch drops out to separate contacts FS6, FS7 and FS8 and to reengage contacts FS9 and FS10. This reinserts the whole of resistance R12 in circuit with generator field winding GF subject to relays BB and CC. The insertion of this resistance decreases the generator voltage to initiate slowing down of the car.

The car therefore slows down and, as it arrives at the third floor, up stop switch USS opens breaking the circuit for the coils of up direction switch U and field and brake switch FB. As a result contacts FB2, U11 and U12 separate, breaking the circuit for the generator field winding and the brake release coil and the application of the brake brings the car to a stop.

When switch FS dropped out at the initiation of the stopping operation, it also reengaged contacts FS1 to connect reset brushes CAR, DHR and UHR to feed line RE1. These brushes engage their corresponding third floor stationary contacts as the car arrives at the floor. With contacts FS1 engaged, the engagement of brush UHR with contact UHC3 completes another circuit for the restoring coil of up third floor relay 3UF, this circuit being through contacts FS1 and UR2, resistance R7, brush UHR, stationary contact UHC3 and contacts 3UF1. The voltage applied to the restoring coil of relay 3UF at this time causes the coil to exert sufficient demagnetizing effect to release the floor relay armature, resetting the floor relay.

The field and brake switch FB upon dropping out also separates contacts FB1 to deenergize the gate control relay GR. This relay drops out to separate contacts GR1 and GR2 and to reengage contacts GR3. Contacts GR1 break the circuit for the coil of time switch TS which starts to drop out. The separation of contacts GR2 breaks the circuit for the coil of gate close switch GC. At the same time the reengagement of contacts GR3 energizes the coil of gate open switch GO. The resultant engagement of contacts GO1 reestablishes the circuit for the coil of time switch TS. Also switch GO causes operation of the gate operating mechanism to unlock the third floor hatchway door and open the car gate. As the gate reaches open position, gate open limit switch GOL breaks the circuit for the coil of switch GO.

Switch GO in dropping out separates contacts GO1 to again break the circuit for the coil of time switch TS. The time switch is delayed in dropping out for an interval sufficient to give the intending passenger at the third floor time to open the hatchway door and step into the car. As the door is opened, door sequence contacts ADS separate, breaking the circuit for the coil of time cancelling relay TC and for the coil of door contact switch DC. The door contact switch, upon dropping out, reengages contacts DC1, reestablishing the circuit for the coil of time switch TS. Thus the time switch is restored to full operated condition.

Upon the passenger entering the car and releasing the hatchway door, the door closes automatically, effecting the engagement of the door sequence contacts ADS. This reenergizes door contact switch DC, which separates its contacts DC1, deenergizing the time switch. The time which elapses after the deenergization of the time switch before the switch fully opens permits the passenger to press a car button for his desired destination and thus determine the direction of car travel.

The car is started in the down direction in response to the pressing of a button for a floor below the car. It is not believed necessary to describe this operation as it is believed it will be understood from the above description of starting the car in the up direction. For starting the car in the down direction relay DR and switch D are operated instead of relay UR and switch U.

It is believed that further operation of the car in response to push buttons will be understood without further detailed description in view of the description of operation of the car in response to push buttons, contained in the aforementioned Lewis et al. patent.

The excitation of the generator in the above described operations is controlled by relays AA, BB and CC. The generator is provided with a fast field. To obviate hunting due to changes in generator excitation relays AA, BB and CC are each of the vibrating type. Each relay is provided with two coils, one an operating coil and the other a control coil. In the case of relays AA and BB, the operating coil is of a strength to provide excitation of the relay in an amount below that required to operate the relay and the control coil acts cumulatively with the operating coil so that whenever the total excitation of the relay is a certain amount, the relay operates. In the case of relay CC, the operating coil is of a strength to operate the relay and the control coil acts to assist or oppose the operating coil to control the operation. Each relay is provided with breaking contacts which act upon operation of the relay to break the circuit for the operating coil to provide a vibrating action. A short-circuited winding, shown in Figure 2s is provided on each relay to damp the vibration. Each relay acts through a switch to control the generator excitation.

In the previously described operation of starting the car in the up direction, both up direction switch U and fast and slow speed switch FS were operated in initiating the starting of the car. Contacts U11 and U12 provided the proper excitation of the generator for upward car travel while the engagement of contacts FS6, FS7 and FS8 and the separation of contacts FS9 and FS10 rendered generator field control resistance R12 subject to breaking contacts A1, B1 and C1 of switches A, B and C respectively for control of acceleration and full speed running of the car. Speed control switch A is responsive to speed control relay AA, the control coil of which is excited by the pilot generator. Thus relay AA is directly subject to the voltage of the pilot generator and therefore is responsive to the speed of the hoisting motor. The operating coil of relay AA is subject to contacts U7, U8, D7 and D8 of the reversing switches so as to enable the operating and control coils to act cumulatively for both directions of car travel. During up car travel, the circuit for the operating coil of relay AA is completed by contacts U7 and U8. Acceleration control switch B is responsive to acceleration control relay BB, the control coil of which is excited from the secondary of transformer T1. Thus relay BB is subject to the first derivative of the voltage of the pilot generator and therefore to the first derivative of the speed of the hoisting motor. The operating coil of relay BB is controlled by the reversing switch contacts controlling the operating coil of relay AA. Similarly, the rate of acceleration control switch C is responsive to the rate of acceleration control relay CC, the control coil of which is excited from the secondary of transformer T2. Thus relay CC is subject to the second derivative of the voltage of the pilot generator and therefore to the second derivative of the speed of the hoisting motor. The operating coil of relay CC is subject to the reversing switch contacts controlling the operating coil of relay AA. Thus the current flow through the operating coils of relays BB and CC is reversed for up and down car travel. Also the operating coils of relays BB and CC are subject to contacts FS2, FS3, FS4 and FS5 of the fast and slow speed switch to cause reverse excitation of these coils for acceleration and retardation. With this control of the operating coils of relays BB and CC, the proper polarity of these coils with respect to the control coils is provided during these periods.

As the car starts in the up direction, the voltage of the pilot generator builds up to induce voltage in the secondary of transformer T1 of a polarity to cause the control coil of acceleration control relay BB to assist the operating coil. As soon as this voltage reaches a certain value, relay BB operates to engage contacts BB2 completing the circuit for the coil of switch B. Switch B separated contacts B1 to insert an adjustable portion of resistance R12 in circuit with the generator field winding to decrease the excitation of the generator field. This decreases the rate of increase in generator voltage. However, relay BB upon operation also separates contacts BB1 which breaks the circuit for its operating coil causing the relay to drop out. This causes switch B to drop out and reengage contacts B1 to again short-circuit the portion of resistance R12 and restore the previous excitation of the generator field. This causes the reoperation of relay BB to cause reinsertion of the portion of resistance R12 in circuit with the generator field winding and the cycle is repeated. The net result is that relay BB vibrates continuously during the acceleration of the car with the ratio of the time the relay is operated to the time the relay is dropped out during a cycle being dependent upon the amount of excitation of the control coil and the natural acceleration curve of the motor under conditions which would exist if full field were maintained on the generator. In other words when the rate of acceleration tends to be higher than desired, the excitation of the control coil is higher so that during this period relay BB is in operated condition for a large portion of each cycle, keeping the resistance portion predominantly in circuit with the field winding. When the rate of acceleration tends to be lower than desired, the excitation of the control coil is lower so that during this period relay BB is in operated condition for a small portion of each cycle, keeping the resistance portion predominantly short-circuited. Thus relay BB acts to cause acceleration at a constant rate within close limits. As the generator nears full voltage, the period of each cycle during which the resistance portion is short-circuited becomes longer and longer due to the natural decrease in slope of the generator voltage curve until finally the excitation on the control coil becomes so low that it is no longer able to cause operation of the relay with the result that the resistance portion remains short-circuited.

During the acceleration of the motor, relay CC is also vibrating due to the periodic closing and opening of the circuit for its operating coil. The portion of each cyclic period that relay CC is operated is determined by the control coil of the relay which acts, when there is any increase in the rate of acceleration, that is, when there is any increase in the rate of voltage build up of the tachometer generator which excites the control coil with a polarity to assist the operating coil, to maintain the relay operated for a large portion of each cyclic period and, when there is any decrease in the rate of acceleration, that is, when there is any decrease in the rate of voltage build up of the tachometer generator which excites the control coil with a polarity to oppose the operating coil, to maintain the relay operated for only a small portion of the period. Switch C which follows the operation of relay CC therefore acts through contacts C1 to maintain the portion of resistance R12 controlled thereby in circuit with the generator field winding for a longer portion of each cycle when the rate of acceleration tends to increase and for a small portion of each cycle when the rate of acceleration tends to decrease. Thus relay CC and switch C act to assist relay BB and switch B to provide the desired acceleration of the elevator car.

Whereas relay BB is controlled by the rate of acceleration and acts when the acceleration becomes greater or less than that desired to correct for the deviation, relay CC responds to the change in the rate of acceleration and therefore acts as an anticipator to minimize the amount of correction to be provided by relay BB. For example, at the instant the circuit is closed to start the car, relay CC starts vibrating immediately. Owing to the fact that the current increases in the primary of transformer T2 as soon as the car starts, sufficient ampere turns are immediately provided by the control coil of relay CC to cause the resistance portion controlled thereby to be inserted in the generator field circuit for a major portion of the cyclic period. This facilitates the motor swinging into the straight line portion of its accelerating curve, providing a smooth transition. As this transition takes place, the voltage on the control coil of relay BB reaches the point at which relay BB starts to vibrate. Thereafter, both relays CC and BB act to keep the acceleration within certain limits, relay CC continuing to anticipate relay BB throughout the accelerating period. In this connection, it is to be noted that relay CC acts as an anticipator both for an increase in the rate of acceleration and for a decrease in the rate of acceleration. In case of a decrease, the control coil is excited in the opposite direction so as to oppose the operating coil, thereby acting to maintain switch C deenergized and the resistance portion short-circuited for a major portion of the cyclic period. As the car nears full speed, the generator voltage curve starts to flatten out. However, both relays BB and CC due to the resultant decrease in ampere turns act to maintain their resistance portions predominantly short-circuited, relay BB trying to maintain the acceleration at a constant rate and relay CC trying to prevent any deviation, thereby minimizing the time required to bring the car to full speed and effecting a smooth transition from acceleration to full speed running.

As the car reaches full speed, the voltage applied to the control coil of relay AA becomes sufficient to cause operation of the relay and relay AA takes control. As this relay comes into operation it acts similarly to relay BB, breaking the circuit for its operating coil with the result that a vibrating operation is had. Relay AA acts through siwtch A which through its contacts A1 controls a third portion of resistance R12, causing this resistance portion to be inserted in the circuit with the generator field winding each time the relay operates. This relay acts to keep the running speed of the elevator hoisting motor within certain limits, regardless of load, since the lighter the load the faster the elevator motor tends to run and thus the greater the voltage applied to the control coil of the relay and thus the longer the portion of each cycle that the resistance portion controlled by the relay is maintained in circuit with the generator field winding. Relay CC which continues to vibrate during full speed operation acts to assist relay AA during this period since the greater the tendency for the speed of the motor to increase the greater the effect of the control coil of relay CC and thus the greater the portion of the cyclic period that the resistance portion controlled by switch C is maintained in circuit with the generator field winding.

Upon initiation of the slow down operation switch FS drops out as the result of the separation of contacts SL5. This causes the separation of contacts FS6, FS7 and FS8 and the reengagement of contacts FS9 and FS10. This causes all of resistance R12 to be inserted in circuit with the generator field winding, decreasing the generator voltage and causing the elevator car to start to slow down. This decreases the voltage of the pilot generator with the result that current flows in the control coil of relay BB in a direction opposite to that for acceleration. Similarly current flows in the control coil of relay CC in a direction opposite to that for acceleration when an increase in the rate of acceleration took place. Switch FS in dropping out also separates contacts FS2 and FS5 and reengages contacts FS3 and FS4 thereby reversing the current flow through the operating coils of relays BB and CC. This gives the desired polarity of these operating coils with respect to their control coils for the slow down operation. As in the case of starting the acceleration, relay CC acts at the initiation of the retardation to facilitate the change. This is due to the fact that as the voltage on the pilot generator starts to decrease the coils of relay CC assist each other with the control coil exerting sufficient effect to cause switch C to be operated and therefore the portion of resistance R12 controlled by contact C2 to be short-circuited for a major portion of the cyclic period. Thus the transition from full speed running to retardation is effected smoothly. As this transition takes place the voltage on the control coil of relay BB reaches a point at which the relay starts to vibrate. Thereafter, as during acceleration, relays CC and BB act to cause retardation to take place at the desired rate which within certain limits will be constant. It is believed this will be understood from the description of control exercised by these relays during acceleration. Briefly, when the rate of retardation tends to be greater than desired relay BB is caused to be in operated condition for a major portion of each cycle to maintain the resistance portion controlled by contacts B2 short-circuited during this cyclic portion and thus decreasing the rate of decay of generator voltage to counteract the too rapid retardation, and when the rate of retardation tends to be less than desired relay BB is in operated condition for only a small portion of each cycle so as to increase the rate of decay of generator voltage to counteract the too slow retardation. Relay CC acts to anticipate these conditions thereby minimizing the amount of control exercised by relay BB. When there is any increase in the rate of retardation the two coils of relay CC assist each other, acting to maintain the relay operated and thus the resistance portion controlled thereby short-circuited for a major portion of the cyclic period, and when there is any decrease in the rate of retardation the two coils oppose each other to cause the resistance portion to be in circuit with the field winding for a major portion of the cyclic period.

As the car comes down to slow speed, the period of each cycle during which the resistance portion controlled by relay BB is inserted in circuit with the generator field winding becomes longer and longer due to the natural decrease in the slope of the generator voltage curve until finally the excitation of the control coil becomes so low that it is no longer able to cause operation with the result that the resistance portion remains in circuit with the generator field winding. The series field winding on the generator acts as the retardation curve flattens out to provide substantially constant speed of the motor regardless of load so that an accurate stop may be made upon opening of the stop switch to stop the car. Relay BB is assisted in the transition by relay CC, relay BB trying to maintain the retardation at the constant rate and CC trying to prevent any deviation in the retardation thereby minimizing the time required to retard the car and effecting a smooth transition from retardation to the slow speed from which the stop is made.

It will be seen therefore that a very effective control of acceleration, full speed running and retardation is provided, relay BB dictating the slope of the acceleration and retardation curves, relay AA dictating the running speed and relay CC acting to minimize any deviation from the operation dictated by relays AA and BB. The particular arrangement shown has the advantage of providing complete adjustment of the various portions of resistance R12 controlled by these relays for both acceleration and retardation. Other arrangements may be utilized, however, in some of which the number of contacts of the switches employed would be considerably reduced. It is not intended to show refinements which might be provided in the system. Also, it is not intended that the application of the invention be limited to the particular control system illustrated as the invention may also be utilized in other systems in which the starting and stopping of the car is controlled automatically, those in which the starting of the car is manually controlled and slow down controlled automatically and those in which both the starting and stopping are under manual control, as for example in car switch controlled elevators. It will be understood that in certain instances, one or two of these relays AA, BB and CC and their respective associated control mechanisms may be omitted.

Many elevator control systems are very complex and admit many variations. In applying the invention to such control systems changes may be made with the view of adapting the invention more readily to such systems. Other changes may also be made which do not depart from the spirit and scope of the invention. It is therefore intended that all matter contained in the above description and shown in the accompanying drawings shall be interpreted as illustrative and not in a limiting sense.

What is claimed is:

1. In a control system for an elevator hoisting motor; means responsive to the speed of said motor for controlling said motor; means responsive to the change in speed of said motor for controlling said motor; and means responsive to the rate of change of a change in speed of said motor for controlling said motor.

2. In a control system for an elevator hoisting motor; means responsive to the speed of said motor for controlling said motor to determine the running speed; means responsive to the acceleration and retardation of said motor for controlling said motor to determine the acceleration and retardation; and means responsive to the rate of change of the acceleration and retardation of said motor for controlling said motor to prevent deviation from said acceleration and retardation as determined by said second named means.

3. In an elevator control system in which a direct current hoisting motor is supplied with current from a source of direct urrent; a relay responsive to the speed of said motor for controlling the voltage of said source to provide substantially constant running speed; a relay responsive to the aceleration and retardation of said motor for controlling the voltage of said source to provide substantially constant acceleration and retardation; and a third relay responsive to the rate of change of the acceleration and retardation of said motor for controlling the voltage of said source to prevent deviation from said constant acceleration and retardation.

4. In an elevator control system in which a direct current hoisting motor is supplied with current by a variable voltage direct current generator having a separately excited field winding; three vibrating relays for controlling the excitation of said generator field winding, each relay having an operating coil and a control coil; means rendering the control coil of one of said relays responsive to the speed of said motor to cause control of the excitation of said field winding by said one relay to provide substantially constant running speed; means rendering the control coil of another of said relays responsive to the acceleration and retardation of said motor to cause control of the excitation of said field winding by said other relay to provide substantially constant aceleration and retardation; and means for rendering the control coil of the third of said relays responsive to the rate of change of the acceleration and retardation of said motor to cause control of the excitation of said field winding by said third relay to prevent deviation from said constant acceleration and retardation.

5. In an elevator control system in which a direct current hoisting motor is supplied with current by a variable voltage direct current generator having a separately excited field winding and in which resistance for said winding is adapted for connection in series therewith to a source of direct current; a direct current tachometer generator driven by said motor; a vibrating relay having an operating coil and a control coil, said control coil being directly responsive to the voltage of said tachometer generator for controlling the operation of said relay to thereby control the effectiveness of said resistance during full speed operation; a second vibrating relay having an operating coil and a control coil, the control coil of said second relay being responsive to the first derivative of the voltage of said tachometer generator for controlling the operation of said second relay to thereby control the effectiveness of said resistance during acceleration and retardation; and a third vibrating relay having an operating coil and a control coil, the control coil of said third relay being responsive to the second derivative of the voltage of said tachometer generator for controlling the operation of said third relay to thereby control the effectiveness of said resistance.

6. In an elevator control system in which a direct current hoisting motor is supplied with current by a variable voltage direct current generator having a separately excited field winding and in which resistance for said winding is adapted for connection in series therewith to a source of direct current; a direct current tachometer generator driven by said motor; a vibrating relay having an operating coil excited from said source and a control coil excited in accordance with the voltage of said tachometer generator for controlling the effectiveness of said resistance during full speed operation; a second vibrating relay having an operating coil excited from said source and a control coil excited in accordance with the rate of change of the voltage of said tachometer generator for controlling the effectiveness of said resistance during acceleration and retardation; and a third vibrating relay having an operating coil excited from said source and a control coil excited in accordance with the rate of change of the change of the voltage of said tachometer generator for controlling the effectiveness of said resistance.

7. In an elevator control system in which a direct current hoisting motor is supplied with current by a variable voltage direct current generator having a separately excited field winding and in which resistance for said winding is adapted for connection in series therewith to a source of direct current; a direct current tachometer generator driven by said motor; two transformers, the primary of one of said transformers being excited from said tachometer generator, and the primary of the other transformer being excited from the secondary of said one transformer; a vibrating relay having an operating coil excited from said source and a control coil excited directly from said tachometer generator for controlling the effectiveness of a portion of said resistance during full speed operation; a second vibrating relay having an operating coil excited from said source and a control coil excited from the secondary of said one transformer for controlling the effectiveness of a portion of said resistance during acceleration and retardation; and a third vibrating relay having an operating coil excited from said source and a control coil excited from the secondary of said other transformer for controlling the effectiveness of a portion of said resistance.

8. In an elevator control system in which a direct current hoisting motor is supplied with current by a variable voltage direct current generator having a separately excited field winding and in which control resistance for said winding is adapted for connection in series therewith to a source of direct current; a direct current tachometer generator driven by said motor; two transformers, the primary of one of said transformers being excited from said tachometer generator, and the primary of the other transformer being excited from the secondary of said one transformer; a vibrating relay operable during full speed operation to control a portion of said resistance, said relay having an operating coil excited from said source and a control coil excited directly from said tachometer generator and acting to control the time during each cyclic period of operation of the relay that the relay is in operated condition; a second vibrating relay operable during acceleration and retardation to control another portion of said resistance, said second relay having an operating coil excited from said source and a control coil excited from the secondary of said one transformer and acting to control the time during each cyclic period of operation of the relay that the relay is in operated condition; and a third vibrating relay operable during acceleration and retardation to control another portion of said resistance, said third relay having an operating coil excited from said source and a control coil excited from the secondary of said other transformer to control the time during each cyclic period of operation of the relay that the relay is in operated condition.

9. In an elevator control system in which a direct current hoisting motor is supplied with current by a variable voltage direct current generator having a separately excited field winding and in which control resistance for said winding is adapted for connection in series therewith to a source of direct current; a direct current tachometer generator driven by said motor; two transformers, the primary of one of said transformers being excited from said tachometer generator, and the primary of the other transformer being excited from the secondary of said one transformer; a vibrating relay adapted when in operated condition to insert a portion of said resistance in circuit with said field winding, said relay having an operating coil excited from said source and a control coil excited directly from said tachometer generator and acting cumulatively with said operating coil to start operation of said relay as the car reaches full speed and thereafter acting to control the time during each cyclic period of operation of the relay that the relay is in operated condition to cause substantially constant running speed of the motor; a second vibrating relay having an operating coil excited from said source and a control coil excited from the secondary of said one transformer and acting cumulatively with said operating coil to cause operation of said relay when the voltage of said tachometer generator is increasing at a certain rate during acceleration and decreasing at a certain rate during retardation and to control the time during each cyclic period of operation of the relay that the relay is in operated condition; means operable during acceleration to cause a portion of said resistance to be in circuit with the field winding when said second relay is in operated condition and during retardation to cause a portion of said resistance to be short-circuited when said second relay is in operated condition, thereby causing acceleration and retardation to take place at a substantially constant rate; a third vibrating relay having an operating coil excited from said source for causing operation of the relay and a control coil excited from the secondary of said other transformer, the coils of said third relay acting cumulatively when there is any increase in the rate of build up of voltage of the tachometer generator during acceleration and any decrease in the rate of decay of such voltage during retardation and acting in opposition when there is any decrease in the rate of build up of such voltage during acceleration and any increase in the rate of decay of such voltage during retardation, said control coil controlling the time during each cyclic period of operation of the relay that the relay is in operated condition; and means operable during acceleration to cause a portion of said resistance to be in circuit with the field winding when said third relay is in operated condition and operable during retardation to cause a portion of said resistance to be short-circuited when said third relay is in operated condition, thereby preventing any substantial deviation from said constant rate of acceleration and retardation.

10. In an elevator control system in which a direct current hoisting motor is supplied with current by a variable voltage direct current generator having a separately excited field winding and in which control resistance for said winding is adapted for connection in series therewith to a source of direct current; a direct current tachometer generator driven by said motor; two transformers, the primary of one of said transformers being excited from said tachometer generator, and the primary of the other transformer being excited from the secondary of said one transformer; three relays for controlling portions of said resistance, each relay having an operating coil excited from said source and a control coil, the control coil of one of said relays being excited directly from said tachometer generator, the control coil of a second of said relays being excited from the secondary of said one transformer, and the control coil of the third of said relays being excited from the secondary of said other transformer, each relay having contacts for breaking the circuit for its operating coil each time the relay operates to cause a vibrating operation; and means controlling the circuits of the operating coils of said relays to cause the coils of said one relay to act cumulatively, to cause the coils of said second relay to act cumulatively during both acceleration and retardation and to cause the coils of the third relay to act cumulatively when there is any increase in the rate of build up of the voltage of the tachometer generator during acceleration and any decrease in the rate of decay of such voltage during retardation and to act in opposition when there is any decrease in the rate of build up of such voltage during acceleration and any increase in the rate of decay of such voltage during retardation, the combined excitation provided by the coils of said second relay being sufficient to operate such relay when the voltage of said tachometer generator is increasing at a certain rate during acceleration and decreasing at a certain rate during retardation, the control coil of the second relay controlling the portion of each cyclic period of the relay that the relay is operated to control the time that a portion of said resistance is in circuit with said field winding, thereby dictating the acceleration and retardation of the motor, the operating coil of said third relay being strong enough to cause operation of said third relay and the control coil of such relay controlling the portion of each cyclic period of the relay that the relay is operated to control the time that a portion of said resistance is in circuit with said field winding, thereby preventing any substantial deviation from the acceleration and retardation dictated by said second relay, the combined excitation provided by the coils of said one relay being sufficient to operate such relay when the voltage of said tachometer generator reaches a certain value, the control coil of such relay controlling the portion of each cyclic period of the relay that the relay is operated to control the time that a portion of said resistance is in circuit with said field winding, thereby causing substantially constant running speed of the motor.

11. In an elevator control system in which a direct current hoisting motor is supplied with current by a variable voltage direct current generator having a separately excited field winding and in which control resistance for said winding is adapted for connection in series therewith to a source of direct current; three switches for controlling separate portions of said resistance; a separately excited direct current tachometer generator driven by said motor; two transformers, the primary of one of said transformers being excited from said tachometer generator, and the primary of the other transformer being excited from the secondary of said one transformer; three relays, one for each switch for causing operation thereof, each relay having an operating coil excited from said source and a control coil, the control coil of one of said relays being excited directly from said tachometer generator, the control coil of a second of said relays being excited from the secondary of said one transformer, and the control coil of the third of said relays being excited from the secondary of said other transformer, each relay having contacts for breaking the circuit for its operating coil each time the relay operates to cause a vibrating operation and also being provided with means to damp the vibrations; and means controlling the circuits of the operating coils of said relays to cause the coils of said one relay to act cumulatively, to cause the coils of said second relay to act cumulatively during both acceleration and retardation and to cause the coils of the third relay to act cumulatively when there is any increase in the rate of build up of the voltage of the tachometer generator during acceleration and any decrease in the rate of decay of such voltage during retardation and to act in opposition when there is any decrease in the rate of build up of such voltage during acceleration and any increase in the rate of decay of such voltage during retardation, the combined excitation provided by the coils of said second relay being sufficient to operate such relay when the voltage of said tachometer generator is increasing at a certain rate during acceleration and decreasing at a certain rate during retardation, the control coil of the second relay controlling the portion of each cyclic period of the relay that the relay is operated to cause through the switch controlled by such relay a portion of said resistance to be in circuit with the generator field winding for a major or minor portion of each cyclic period depending upon whether during acceleration the acceleration respectively exceeds or falls below a certain rate and whether during retardation the retardation respectively falls below or exceeds a certain rate, thereby dictating the acceleration and retardation of the motor, the operating coil of said third relay being strong enough to cause operation of said third relay and the control coil of such relay controlling the portion of each cyclic period of the relay that the relay is operated to cause through the switch controlled by the relay a portion of said resistance to be in circuit with the generator field winding for a portion of each cyclic period during acceleration and retardation such as to prevent any substantial deviation from the acceleration and retardation dictated by said second relay, the combined excitation provided by the coils of said one relay being sufficient to operate such relay when the voltage of said tachometer generator reaches a certain value, the control coil of such relay controlling the portion of each cyclic period of the relay that the relay is operated to cause through the switch controlled by the relay a portion of said resistance to be in circuit with the generator field winding during full speed running for a portion of each cyclic period which is greater the more the tachometer generator voltage and therefore the more the speed tends to exceed a certain value to cause substantially constant running speed of the motor.

12. In a control system for an elevator hoisting motor; means responsive to the first derivative of the speed of the motor for controlling the motor; and means responsive to the second derivative of the speed of the motor for controlling the motor.

13. In a control system for an elevator hoisting motor; means responsive to the acceleration and retardation of said motor for controlling said motor to determine the acceleration and retardation thereof; and means responsive to the rate of change of the acceleration and retardation of said motor for controlling said motor to prevent deviation from said acceleration and retardation as determined by said first named means.

14. In a control system for a direct current elevator hoisting motor supplied with current from a direct current source; a pair of relays; means for rendering one of said relays responsive to the acceleration and retardation of said motor for controlling the voltage of said source to cause substantially constant acceleration and retardation of said motor; and means for rendering the other relay responsive to the rate of change of the acceleration and retardation of said motor for controlling the voltage of said source to prevent deviation from said constant acceleration and retardation.

15. In a control system for a direct current elevator hoisting motor supplied with current from a direct current source; a pair of relays; means for rendering one of said relays responsive to the acceleration and retardation of said motor; means for rendering the other relay responsive to the rate of change of the acceleration and retardation of said motor; and means controlled by said relays for controlling the voltage of said source to cause substantially constant acceleration and retardation of said motor.

16. In a control system for a direct current elevator hoisting motor supplied with current from a variable voltage direct current generator; a pair of vibrating relays, each having an operating coil and a control coil; means for rendering the control coil of one of said relays responsive to the acceleration and retardation of said motor; means for rendering the control coil of the other relay responsive to the rate of change of the acceleration and retardation of said motor; and means controlled by said relays for controlling the excitation of said generator to cause substantially constant acceleration and retardation of said motor.

17. In a control system for a direct current elevator hoisting motor supplied with current from a variable voltage direct current generator having a separately excited field winding; a direct current tachometer generator driven by said motor; a pair of vibrating relays for controlling the excitation of said field winding, each having an operating coil and a control coil; means for rendering the control coil of one of said relays responsive to the first derivative of the voltage of said tachometer generator; and means for rendering the control coil of the other relay responsive to the second derivative of the voltage of said tachometer generator.

18. In a control system in which a direct current hoisting motor is supplied with current from a variable voltage direct current generator having a separately excited field winding and in which resistance is connected in series with said winding to a source of direct current for controlling the excitation of said generator; a direct current tachometer generator driven by said motor; two transformers, the primary of one of said transformers being excited from said tachometer generator and the primary of the other transformer being excited from the secondary of said one transformer; and a pair of vibrating relays for controlling said resistance, each having an operating coil and a control coil, the operating coils being excited from said source, the control coil of one of said relays being excited from the secondary of said one transformer and the control coil of the other relay being excited from the secondary of said other transformer.

19. In a control system in which a direct current hoisting motor is supplied with current from a variable voltage direct current generator having a separately excited field winding and in which resistance is connected in series with said winding to a source of direct current for controlling the excitation of said generator; a direct current tachometer generator driven by said motor; two transformers, the primary of one of said transformers being excited from said tachometer generator and the primary of the other transformer being excited from the secondary of said one transformer; a vibrating relay operable during acceleration and retardation to control a portion of said resistance, said relay having an operating coil excited from said source and a control coil excited from the secondary of said one transformer and acting to control the time during each cyclic period of operation of the relay that the relay is in operated conditon; another vibrating relay operable during acceleration and retardation to control another portion of said resistance, said other relay having an operating coil excited from said source and a control coil excited from the secondary of said other transformer to control the time during each cyclic period of operation of the relay that the relay is in operated condition.

20. In a control system in which a direct current hoisting motor is supplied with current from a variable voltage direct current generator having a separately excited field winding and in which resistance is connected in series with said winding to a source of direct current for controlling the excitation of said generator; a direct current tachometer generator driven by said motor; two transformers, the primary of one of said transformers being excited from said tachometer generator and the primary of the other transformer being excited from the secondary of said one transformer; a vibrating relay having an operating coil excited from said source and a control coil excited from the secondary of said one transformer and acting cumulatively with said operating coil to cause operation of said relay when the voltage of the tachometer generator is increasing at a certain rate during acceleration and decreasing at a certain rate during retardation and also acting during each cyclic period of operation to control the time during the period that the relay is in operated condition; means operable during acceleration to cause a portion of said resistance to be in circuit with the field winding when said relay is in operated condition and during retardation to cause a portion of said resistance to be short-circuited when said relay is in operated condition, thereby causing acceleration and retardation to take place at a substantially constant rate; another vibrating relay having an operating coil excited from said source and a control coil excited from the secondary of said other transformer, the coils of said other relay acting cumulatively when there is any increase in the rate of build up of voltage of the tachometer generator during acceleration and any decrease in the rate of decay of such voltage during retardation and acting in opposition when there is any decrease in the rate of build up of such voltage during acceleration and any increase in the rate of decay of such voltage during retardation, said control coil also acting during each cyclic period of operation of the relay to control the time during the period that the relay is in operated condition; and means operable during acceleration to cause a portion of said resistance to be in circuit with the field winding when said other relay is in operated condition and operable during retardation to cause a portion of said resistance to be short-circuited when said other relay is in operated condition, thereby preventing any substantial deviation from said constant rate of acceleration and retardation.

21. In a control system for a direct current elevator hoisting motor supplied with current from a direct current source; means responsive to the speed of the motor for controlling the voltage of said source; and means responsive to the rate of change in the speed of the motor for controlling the voltage of said source.

22. In a control system for a direct current elevator hoisting motor supplied with current from a direct current source; a pair of relays; means for rendering one of said relays subject to the speed of said motor and the other relay subject to the acceleration and retardation of said motor; and means controlled by said relays for controlling the voltage of said source to control the acceleration, retardation and running speed of said motor.

23. In an elevator control system in which a direct current hoisting motor is supplied with current from a variable voltage direct current generator; a pair of vibrating relays, each having an operating coil and a control coil; means for rendering the control coil of one of said relays subject to the speed of said motor and the control coil of the other relay subject to the acceleration and retardation of said motor; and means controlled by said relays for controlling the excitation of said generator to cause substantially constant acceleration, retardation and running speed of said motor.

24. In an elevator control system in which a direct current hoisting motor is supplied with current from a variable voltage direct current generator having a separately excited field winding adapted for connection to a source of direct current and in which control resistance is provided for said winding; a direct current tachometer generator driven by said motor; a pair of vibrating relays for controlling said resistance, each relay having an operating coil excited from said source and a control coil; and means for rendering the control coil of one of said relays directly subject to the voltage of said tachometer generator and the control coil of the other relay subject to the first derivative of such voltage.

25. In an elevator control system in which a direct current hoisting motor is supplied with current from a variable voltage direct current generator having a separately excited field winding and in which resistance is connected in series with said winding to a squrce of direct current for controlling the excitation of said generator; a direct current tachometer generator driven by said motor; a transformer having its primary excited from said tachometer generator; a vibrating relay operable during acceleration and retardation to control a portion of said resistance, said relay having an operating coil excited from said source and a control coil excited from the secondary of said transformer and acting during each cyclic period of operation to control the time during the period that the relay is in operated condition; and another vibrating relay operable during full speed running to control another portion of said resistance, said other relay having an operating coil excited from said source and a control coil excited directly from said tachometer generator and acting during each cyclic period of operation of the relay to control the time during the period that the relay is in operated condition.

26. In an elevator control system in which a direct current hoisting motor is supplied with current from a variable voltage direct current generator having a separately excited field winding and in which resistance is connected in series with said winding to a source of direct current for controlling the excitation of said generator; a direct current tachometer generator driven by said motor; a transformer having its primary excited from said tachometer generator; a vibrating relay having an operating coil excited from said source and a control coil excited from the secondary of said transformer and acting cumulatively with said operating coil to cause operation of said relay when the voltage of the tachometer generator is increasing at a certain rate during acceleration and decreasing at a certain rate during retardation and also acting during each cyclic period of operation to control the time during the period that the relay is in operated condition; means operable during acceleration to cause a portion of said resistance to be in circuit with the field winding when said relay is in operated condition and during retardation to cause a portion of said resistance to be short-circuited when said relay is in operated condition, thereby causing acceleration and retardation to take place at a substantially constant rate; another vibrating relay having an operating coil excited from said source and a control coil excited directly from said tachometer generator and acting cumulatively with said operating coil to cause operation of said other relay as the tachometer generator voltage reaches a value corresponding to full speed of said hoisting motor, said control coil thereafter acting during each cyclic period of operation of the relay to control the time during the period that the relay is in operated condition; and means operable to cause a portion of said resistance to be in circuit with the field winding when said other relay is in operated condition to thereby cause substantially constant running speed of the motor.

27. In a control system for a direct current hoisting motor; means responsive to the speed of said motor for causing substantially constant running speed; and means responsive to the rate of change of a change in the speed of said motor for preventing deviation from said constant running speed.

28. In a control system for a direct current hoisting motor; a direct current tachometer generator driven by said motor; a pair of vibrating relays for controlling the voltage of said source, each relay having an operating coil and a control coil; means rendering the control coil of one of said relays subject to the voltage of said generator and the control coil of the other relay subject to the second derivative of said voltage.

29. In a control system for a direct current elevator hoisting motor; a source of direct current for said motor; a vibrating relay having an operating coil and a control coil; means for controlling said control coil in accordance with the speed of said motor; and means controlled by said relay for controlling the voltage of said source to cause substantially constant running speed of said motor.

30. In a control system for a direct current elevator hoisting motor; a source of direct current for said motor; a direct current tachometer generator driven by said motor; a vibrating relay having an operating coil and a control coil; means rendering said control coil subject to the voltage of said generator, said coils acting cumulatively to cause operation of said relay when said voltage exceeds a certain value; and means controlled by said relay for controlling the voltage of said source, said control coil acting during each cyclic period of operation of said relay to determine the time during such period that the relay is in operated condition to cause substantially constant running speed of said motor.

31. In an elevator control system in which a direct current hoisting motor is supplied with current by a variable voltage direct current generator having a field winding excited from a source of direct current and in which control resistance is provided for said winding; a direct current tachometer generator driven by said motor; a vibrating relay having an operating coil excited from said source and a control coil excited by said tachometer generator, said coils acting cumulatively to cause operation of said relay as the motor reaches running speed; and means controlled by said relay for controlling the effectiveness of said resistance, said control coil acting during each cyclic period of operation of said relay to determine the time during each period that the relay is in operated condition to cause substantially constant running speed of said motor.

32. In an elevator control system in which a direct current hoisting motor is supplied with current by a variable voltage direct current generator having a separately excited field winding; a vibrating relay having an operating coil and a control coil; means rendering said control coil subject to the first derivative of the speed of said motor; and means controlled by said relay for controlling the excitation of said field winding.

33. In an elevator control system in which a direct current hoisting motor is supplied with current by a variable voltage direct current generator having a separately excited field winding; a direct current tachometer generator driven by said motor; a vibrating relay having an operating coil and a control coil; means rendering said control coil subject to the first derivative of the voltage of said tachometer generator to cause said control coil to govern during each cyclic period of operation of said relay the time during each period that the relay is in operated condition; and means controlled by said relay for controlling the excitation of said field winding.

34. In an elevator control system in which a direct current hoisting motor is supplied with current by a variable voltage direct current generator having a field winding excited from a source of direct current and in which control resistance is provided for said winding; a direct current tachometer generator driven by said motor; a transformer excited by said tachometer generator; a vibrating relay having an operating coil excited from said source and a control coil excited from the secondary of said transformer, said coils acting cumulatively to cause operation of said relay when the voltage of said tachometer generator is increasing at a certain rate during acceleration and decreasing at a certain rate during retardation and said control coil acting during each cyclic period of operation of said relay to determine the time during such period that the relay is in operated condition; and means controlled by said relay for controlling the effectiveness of said resistance.

35. In an elevator control system in which a direct current hoisting motor is supplied with current from a source of direct current; a relay subject to the rate of change of change in speed of said motor; and means controlled by said relay for controlling the voltage applied to said motor.

36. In an elevator control system in which a direct current hoisting motor is supplied with current by a variable voltage direct current generator having a separately excited field winding; a vibrating relay having an operating coil and a control coil; means rendering said control coil subject to the rate of change of change in speed of said motor; and means controlled by said relay for controlling the excitation of said field winding.

37. In an elevator control system in which a direct current hoisting motor is supplied with current by a variable voltage direct current generator having a separately excited field winding; a direct current tachometer generator driven by said motor; a vibrating relay having an operating coil and a control coil; means rendering said control coil subject to the second derivative of the voltage of said tachometer generator to cause said control coil to govern during each cyclic period of operation of said relay the time during each period that the relay is in operated condition; and means controlled by said relay for controlling the excitation of said field winding.

38. In an elevator control system in which a direct current hoisting motor is supplied with current by a variable voltage direct current generator having a field winding excited from a source of direct current and in which control resistance is provided for said winding; a direct current tachometer generator driven by said motor; a transformer excited from said tachometer generator; a second transformer excited from the secondary of the first transformer; a vibrating relay having an operating coil excited from said source and a control coil excited from the secondary of said second transformer, said control coil acting during each cyclic period of operation of said relay to determine the time during each period that the relay is in operated condition; and means controlled by said relay for controlling said resistance.

39. In a control system for a direct current hoisting motor supplied with current from a direct current source; three relays for controlling the voltage of said source; and means for rendering one of said relays directly subject to the speed of said motor, a second of said relays subject to acceleration of said motor and the third of said relays subject to the rate of change of acceleration of said motor.

40. In an elevator control system in which a direct current hoisting motor is supplied with current by a variable voltage direct current generator having a separately excited field winding; three relays for controlling the excitation of said generator; and means for rendering one of said relays directly subject to the speed of said motor, a second of said relays subject to the first derivative of the speed of said motor and the third of said relays subject to the second derivative of the speed of said motor.

41. In an elevator control system in which a direct current hoisting motor is supplied with current by a variable voltage direct current generator having a separately excited field winding; three vibrating relays for controlling the excitation of said generator, each relay having an operating coil and a control coil; and means for rendering the control coil of one of said relays directly subject to the speed of said motor, the control coil of a second of said relays subject to the acceleration and retardation of said motor and the control coil of the third of said relays subject to the rate of change of acceleration and retardation of said motor.

42. In an elevator control system in which a direct current hoisting motor is supplied with current by a variable voltage direct current generator having a field winding excited from a source of direct current and in which control resistance is provided for said winding; a direct current tachometer generator driven by said motor; and three vibrating relays for controlling said resistance, each relay having an operating coil excited from said source and a control coil, the control coil of one of said relays being directly subject to the voltage of said tachometer generator, the control coil of a second of said relays being subject to the first derivative of said voltage and the control coil of the third of said relays being subject to the second derivative of said voltage.

43. In an elevator control system in which a direct current hoisting motor is supplied with current by a variable voltage direct current generator having a separately excited field winding and in which control resistance for said winding is adapted for connection in series therewith to a source of direct current; a direct current tachometer generator driven by said motor; two transformers, the primary of one of said transformers being excited from said tachometer generator, and the primary of the other transformer being excited from the secondary of said one transformer; and three relays for controlling portions of said resistance, each relay having an operating coil excited from said source and a control coil, the control coil of one of said relays being excited directly from said tachometer generator, the control coil of a second of said relays being excited from the secondary of said one transformer, and the control coil of the third of said relays being excited from the secondary of said other transformer, each relay having contacts for breaking the circuit for its operating coil each time the relay operates to cause a vibrating operation and also being provided with means to damp the vibrations.

HERBERT LOEB HEART.
LEE IRWIN DAVIS.